United States Patent [19]

Shirasaki

[11] 4,392,722
[45] Jul. 12, 1983

[54] PRISM POLARIZER

[75] Inventor: Masataka Shirasaki, Kawasaki, Japan

[73] Assignee: Fujitsu Limited, Kawasaki, Japan

[21] Appl. No.: 261,877

[22] Filed: May 8, 1981

[30] Foreign Application Priority Data

May 9, 1980 [JP] Japan ............................ 55-63659[U]

[51] Int. Cl.³ .......................... G02B 5/04; G02F 1/09; G02F 1/29
[52] U.S. Cl. .................................. 350/375; 350/394; 350/395; 350/400; 350/402
[58] Field of Search ....................... 350/375, 394–395, 350/400–403, 381–382, 385

[56] References Cited

U.S. PATENT DOCUMENTS

2,182,142 12/1939 Ball et al. ............................ 350/401
3,449,039 6/1969 Hoffman, Jr. ....................... 350/394
3,449,576 6/1969 Hoffman, Jr. et al. .............. 350/394

*Primary Examiner*—William H. Punter
*Attorney, Agent, or Firm*—Staas & Halsey

[57] ABSTRACT

A prism polarizer comprising a pair of anisotropic crystal prisms faced to each other. Each of the crystal prisms comprises a crystal which has an optical characteristic such that the difference between the square of the refractive index for extraordinary rays and the square of the refractive index for ordinary rays is larger than 1. The angle of incidence of a beam upon the facing plane of the pair of prisms is equal to the Brewster angle for the refractive index for P-polarization rays. P-polarization rays are transmitted through the facing plane. S-polarization rays are totally reflected at the facing plane. Thereby, the incident beam is separated into two polarized beams. Each of the pair of prisms is formed so that each polarized beam is totally reflected within each prism and that the separated outlet beams from the pair of prisms are parallel with each other.

16 Claims, 14 Drawing Figures

PRISM POLARIZER

TECHNICAL FIELD

The present invention relates to an optical device, and more particularly, to a polarizer, comprising prisms, which is suitable for use in an optical switch or an optical circulator of small size.

BACKGROUND OF THE INVENTION

Various improved passive optical devices have been utilized in the optical transmission system of today.

An optical circulator is one of such passive devices for use in the optical transmission system. The optical circulator has, for example, four ports for entrance and exit of a light beam. A beam introduced from a first port is transmitted to a second port. A beam introduced from the second port is transmitted to a third port. A beam introduced from the third port is transmitted to a fourth port. A beam introduced from the fourth port is transmitted to the first port. Four ports are optically interconnected so that a beam is cyclically transmitted in the above manner, i.e. 1→2, 2→3, 3→4, 4→1. Such an optical circulator will make it possible to realize a complicated function such as two-way communication, impediment research, or data link, in an optical transmission system in the near future.

Occurrence of transmission loss or crosstalk should be minimized in the optical circulator as well as in an optical switch or an optical branching filter. In order to obviate the transmission loss and the crosstalk, rays of light emitted from an inlet optical fiber are made parallel by means of a lens, so as to make a beam. Then, this beam is operated on in a prescribed manner within the device. After that, the beam is converged to an outlet optical fiber by another lens. However, some light leaks from the beam even though the rays of the beam are paralleled by the lens. Therefore, there is some transmission loss of light between the inlet fiber and the outlet fiber. Accordingly, it is desirable that the size of the optical device be minimized so as to avoid the path length of light being elongated, in order to minimize transmission losses.

In general, a polarizer used in the optical circulator or the optical devices comprises two prisms of anisotropic crystals faced to each other. The prisms are usually made of calcite. An incident beam upon the facing plane is separated into two polarized beams, i.e. a beam of ordinary rays and a beam of extraordinary rays. The polarizations of the beams are perpendicular to each other.

Examples of such a polarizer or a beam splitter in the prior art are disclosed in Japanese Patent Publications 45-13278 and 52-49967 and Laid Open Japanese Patent Application 49-93028. In the polarizer of the prior art, the size of the prism is large when compared with the diameter of the beam. Therefore, it is difficult to make the optical device comprising this polarizer to be small in size. Besides, the beam is not reliably separated in the prior art polarizer. Therefore, when the polarizer is used in an optical circulator, excessive transmission loss and the problem of crosstalk occur.

SUMMARY OF THE INVENTION

The present invention was made considering the above points.

An object of the present invention is to provide a polarizer comprising prisms, which is small in size and enables complete separation of the incident beam so that the transmission loss and the crosstalk are minimized.

A prism polarizer according to the present invention comprises a pair of anisotropic crystal prisms which are faced to each other; said crystal prisms being comprised of a crystal which has a refractive index for ordinary rays and another refractive index for extraordinary rays, the difference between the square of the refractive index for ordinary rays and the square of the refractive index for extraordinary rays being larger than 1; the P-polarization rays of the incident beam upon the facing plane of said pair of prisms being used as said ordinary rays and the angle of incidence being equal to the Brewster angle for said refractive index for said ordinary rays, so that P-polarization rays are transmitted through said facing plane while S-polarization rays are totally reflected at said facing plane, thereby separating the incident beam into two polarized beams; each of said prisms being formed so that each of said polarized beams is totally reflected within each prism and that the separated outlet beams from said prisms are parallel with each other.

In a preferred embodiment of the present invention, each of the prisms is arranged so that an entrance beam into the prism is slightly shifted from the direction perpendicular to an entrance end surface of the prism and that an exit beam out of the prism is slightly shifted from the direction perpendicular to an exit end surface of the prism.

Embodiments of the present invention will be described hereinafter with reference to the accompanying drawings.

DETAILED DESCRIPTION OF THE PREFERRED EMBODIMENTS

Figure 1:
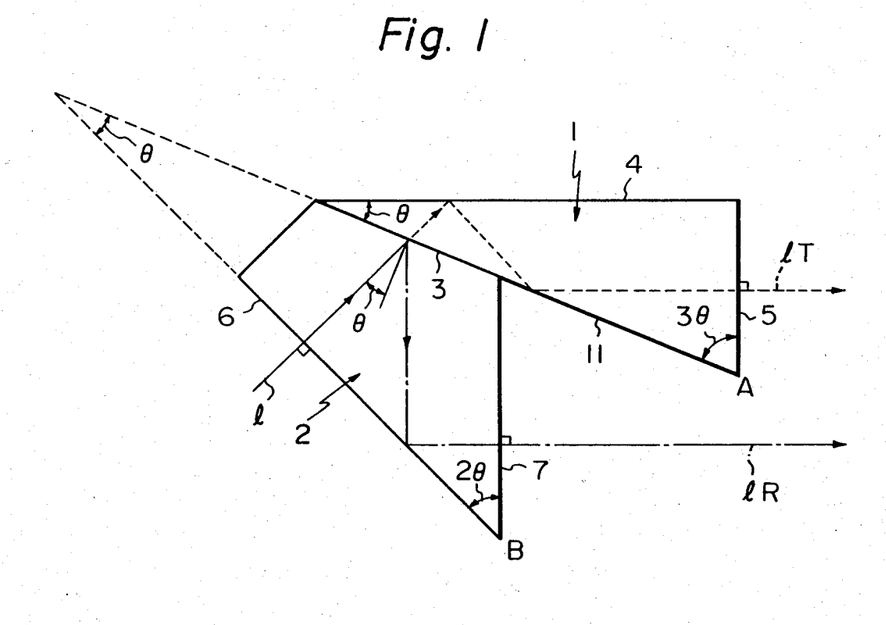
FIG. 1 is an example of a prism polarizer according to the present invention.

In FIG. 1, reference numerals 1 and 2 designate optical prisms of triangular prism shape and quadrilateral prism shape, respectively. Each prism is made of rutile ($TiO_2$: titanium dioxide). The optical axis of each prism is perpendicular to the drawing. Reference numeral 3 designates a facing plane between the prisms 1 and 2. In fact, there is a very thin gap of about 10 $\mu$ between the prisms 1 and 2 so that a thin layer of air is formed therebetween. Such a gap is formed by disposing spacers such as thin wires of 10 $\mu$ diameter between the two prisms which are combined with each other by suitable means. Instead of forming such a gap of a layer of air, the two prisms may be combined by means of an adherent agent which has an optical characteristic suitable for achieving the optical functions described later.

The prism 1 has surfaces 4, 5, 11 for inner total reflection and entrance for optical beam. The prism 2 has surfaces 6 and 7 for inner total reflection and entrance for optical beam.

The configurations of these prisms are as follows.

The surface 4 of the prism 1 is inclined by an angle $\theta$ with respect to the facing plane 3. The angle $\theta$ is the Brewster angle for the P-polarization rays which pass through the surface of the prism from the inside of the outside thereof. The surface 6 of the prism 2 is also inclined by the Brewster angle $\theta$ with respect to the facing plane 3. The titanium dioxide has two refractive indices $n_o$ and $n_e$ for ordinary rays and extraordinary rays, respectively. The refractive index $n_o$ for ordinary rays is 2.46 at the wavelength of 1.3 $\mu$m. The refractive index $n_e$ for extraordinary rays is 2.72 at the wavelength of 1.3 $\mu$m. The ordinary ray is a ray which polarization plane is perpendicular to the optic axis. The extraordinary ray is a ray which polarization plane is parallel to the optical axis. The optical axis of this titanium dioxide crystal is arranged so that P-polarization rays are transmitted as being ordinary rays while S-polarization rays are reflected as being extraordinary rays.

The Brewster angle $\theta$ is defined on the basis of the refractive index of $n_o$ for the ordinary rays as follows.

$$\theta = \text{arccot } n_o \div 22.1°$$

An incident beam 1 introduced perpendicularly through the surface 6 of the prism 2 has an angle of incidence of $\theta$ with respect to the facing plane 3. The surface 5 and the surface 7 are formed as being parallel to each other and perpendicular to the beams $1_T$ and $1_R$ which are emitted out of the prisms 1 and 2, respectively. In this example, the vertical angles A and B which define the surfaces 5 and 7 of the prisms 1 and 2 and $3\theta$ and $2\theta$, respectively.

The above described assembly of prisms 1 and 2 operates as follows.

A beam of unpolarized light (natural light) 1 enters the prism 2 through the surface 6 perpendicularly to this surface 6. The angle of incidence of this beam 1 to the facing plane 3 is the Brewster angle $\theta$. Therefore, ordinary rays included within the unpolarized beam 1 completely pass through this facing plane 3. On the other hand, extraordinary rays included within the unpolarized beam 1 are totally reflected by this facing plane 3 since the extraordinary rays in the titanium dioxide meet the total reflection condition represented by the formula $n_e \sin\theta \div 1.02 > 1$.

Accordingly, the natural light 1 is completely separated into two polarized beams, i.e. one is a beam $1_T$ of ordinary rays and the other is a beam $1_R$ of extraordinary rays. In the polarizer of the prior art comprising prisms of calcite, there is a defective point that a part of the polarized rays is reflected at the facing plane which rays are to be transmitted through the facing plane instead of being reflected. Such defectiveness is completely obviated in the above mentioned polarizer of the present invention comprising prisms of titanium dioxide.

Any other anisotropic material can be used instead of titanium dioxide if the optical characteristic of the material meets the following conditions with respect to the refractive index $n_o$ for ordinary rays, the refractive index $n_e$ for extraordinary rays, and the Brewster angle $\theta$ for ordinary rays.

$$n_e \sin\theta > 1 \quad (1)$$

$$\cot\theta = n_o \quad (2)$$

from (1) $n_e^2 > \text{cosec}^2\theta$ (1)' from (2) $n_o^2 = \cot^2\theta$ (2)'

(1)'-(2)' makes $n_e - n_o^2 > 1$ (3)

The formula (1) represents the condition that the extraordinary rays are totally reflected at the boundary surface. The formula (2) represents the condition that the ordinary rays pass through the boundary surface. The formula (3) is derived from the formulas (1) and (2). Therefore, a beam of rays which meets the formula (3) is completely separated into a beam of ordinary rays and another beam of extraordinary rays. In the case that titanium dioxide is used, the value of $n_e^2 - n_o^2$ is approximately, 1.35 at the wavelength of 1.3 $\mu$. Therefore, the titanium dioxide meets the condition of formula (3).

If the pair of prisms are combined by an adhesive agent of refraction index of n instead of forming a gap of air between the prisms, the formula (1) is rewritten to $n_e \sin\theta > n$, and the formula (3) is rewritten to $n_e^2 - n_o^2 > n^2$.

Figure 3:
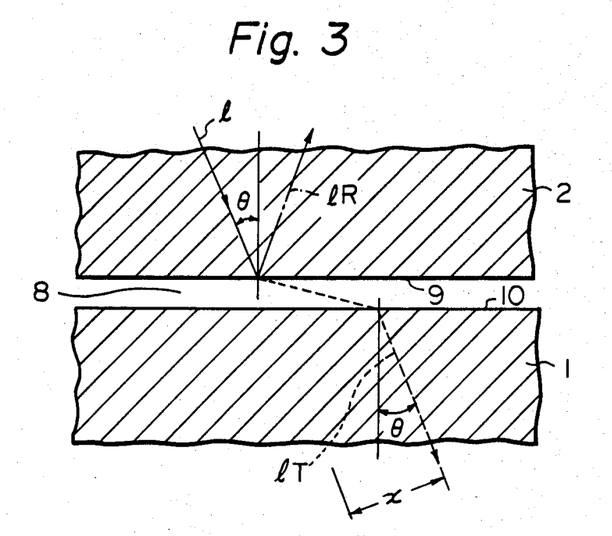
FIG. 3 is a detailed view of facing surfaces of a pair of prisms according to the present invention.

In FIG. 1, the incident beam 1 (solid line) is completely separated into a polarized beam $1_T$ (dotted line) of ordinary rays and another polarized beam $1_R$ (a dash-dot line) of extraordinary rays. The beam $1_T$ of ordinary rays enters into the prism 1 through the gap existing on the facing plane 3, in the same direction of the incident beam 1. Actual pass of the beam $1_T$ is shown in FIG. 3. The beam $1_T$ is refracted at the boundary surface 9 between the prism 2 and the gap 8, and then refracted again at the boundary surface 10 between the prism 1 and the gap 8. At the second refraction, the beam $1_T$ is refracted in the reverse direction to the refraction direction at the first refraction. The second refraction angle is equal to the Brewster angle $\theta$ as illustrated in FIG. 3. Therefore, the beam $1_T$ of ordinary rays in the prism 1 is parallel to the incident beam 1. The distance x between the beams 1 and $1_T$ is represented as follows.

$$x = t \cdot \sin(90° - 2\theta)/\sin\theta$$

in which t is depth of the gap 8.

As an example, $x = 19$ $\mu$ provided that the Brewster angle $\theta = 22.1°$ and $t = 1.0$ $\mu$. Such a distance x can be neglected.

In FIG. 1, the beam $1_T$ of ordinary rays passes through the prism 1 while the beam $1_R$ of extraordinary rays passes through the prism 2. The beams $1_T$ and $1_R$ are totally reflected twice within the respective prisms 1 and 2 as follows. The beam $1_T$ of ordinary rays included within the incident beam 1 is totally reflected at the surface 4 and the surface 11 which is substantially the same as the facing plane 3. The beam $1_R$ of extraordinary rays is totally reflected at the facing plane 3 and the surface 6. The two beams $1_T$ and $1_R$ are symmetrically separated with respect to the facing plane 3 and reflected at the surfaces 4 and 6 which are inclined by the same angle of $\theta$ with respect to the facing plane 3. Therefore, the two beams $1_T$ and $1_R$ are paralleled by being totally reflected twice within the respective prisms. The paralleled beams $1_T$ and $1_R$ pass through the end surfaces 5 and 7, and out of the prisms 1 and 2, respectively. The exit beams $l_T$ and $l_R$ are perpendicular to the end surfaces 5 and 7, respectively.

In the polarizer according to the present invention, the two separated beams of ordinary rays and extraordinary rays are paralleled without using further optical devices. Therefore, an optical circulator of small size and comprising a small number of parts can be realized by using the polarizer of the present invention, as described later.

Figure 2:
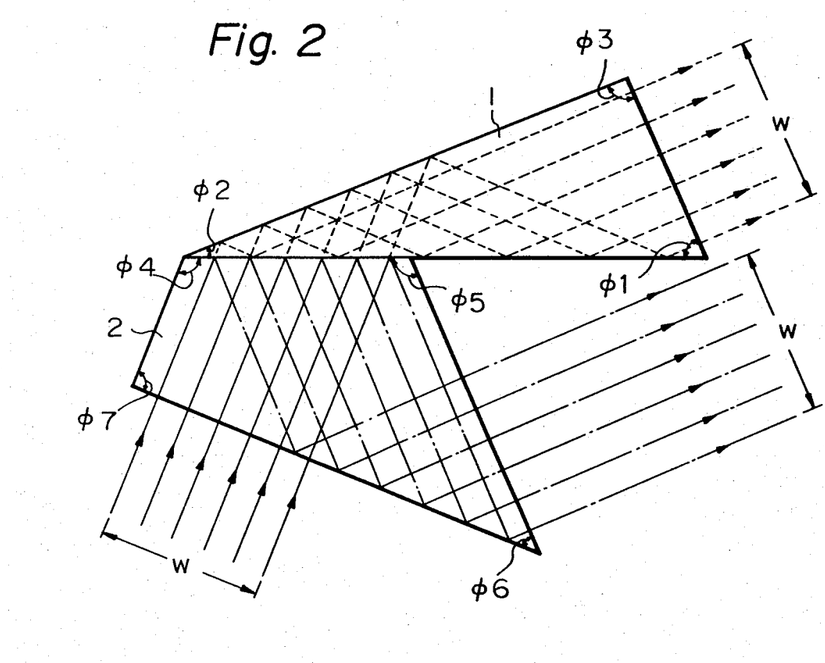
FIG. 2 shows the relation between the width of an optical beam and the size of the prism of FIG. 1.

In FIG. 2, the width of each beam within each prism is illustrated so as to show that the polarizer is small with respect to the beam width, i.e., almost the entire portions of the prisms are actually used to pass the beam, and the exit beams are close to each other.

Vertical angles of the prisms are as follows.
$\phi_1 = 66.29°$
$\phi_2 = 22.10°$
$\phi_3 = 91.61°$
$\phi_4 = 112.10°$
$\phi_5 = 113.71°$
$\phi_6 = 44.19°$
$\phi_7 = 90°$ As can be seen from the drawing, the inner portion of each prism is effectively used to pass of beam of width w. Also, it can be seen that the paralleled exit beams are close to each other.

An optical circulator using the above mentioned polarizer of the present invention is illustrated in FIGS. 4 through 7. This optical circulator includes a first polarizer 15 which comprises a pair of prisms 11, 12 and a second polarizer 16 which comprises a pair of prisms 13, 14. A rotatory polarization device 17 is disposed between the first and the second polarizer 15, 16.

Figure 8:
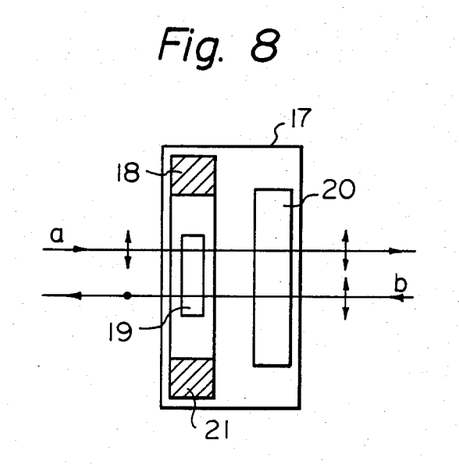
FIG. 8 is a detailed view of a rotatory polarization device used in the optical circulator of FIGS. 4 through 7.

The rotatory polarization device 17 is illustrated in FIG. 8. The device 17 comprises a Faraday rotator 21 for 45° rotation of polarization plane and a rotatory polarization plate 20 of such as a half wave plate. The Faraday rotator 21 comprises a permanent magnet ring 18 for generating a magnetic field and a transparent magnetic piece 19 of YIG ($Y_3Fe_5O_{12}$) crystal. Each of the Faraday rotator 21 and the rotatory polarization plate 20 rotates by 45° of the polarization plane of an optical beam which passes therethrough. The rotational directions of the Faraday rotator 21 and the rotatory polarization plate 20 are opposite to each other for the beam travelling from the left to the right in the drawing, while the rotational directions are the same for the beam travelling from the right to the left. The thickness and the position of the magnetic piece 19 or the rotatory polarization plate 20 are determined so that they achieve the above mentioned functions. The polarization plane of a beam (a) entering the rotatory polarization device from the left is rotated by 45° by the Faraday rotator 21 in one direction and then rotated by 45° by the rotatory polarization plate 20 in the reverse direction so that the polarization plane restores to the original position, i.e. the polarization plane is unchanged by the rotatory polarization device 17. Therefore, if an ordinary ray is introduced from the left into the device 17, the ray exits out of the device as being the ordinary ray. Similarly, if an extraordinary ray is introduced from the left into the device 17, the ray exits out of the device as being the extraordinary ray.

On the other hand, the polarization plane of a beam (b) entering the rotatory polarization device from the right is rotated by 45° by the rotatory polarization plate 20 in one direction and then rotated again by 45° by the Faraday rotator 21 in the same direction so that the polarization plane is rotated by 90° in total. Therefore, an ordinary ray from the right is changed to an extraordinary ray. Similarly, an extraordinary ray from the right is changed to an ordinary ray.

A first port $P_1$ (FIG. 4 and FIG. 7) is provided for entrance and exit for the beam into and out of the prism 11 of the first polarizer 15. Similarly, a second port $P_2$ (FIGS. 4 and 5), a third port $P_3$ (FIGS. 5 and 6) and a fourth port $P_4$ (FIGS. 6, 7) are provided at positions facing the prisms 13, 12, 14, respectively.

Figure 4:
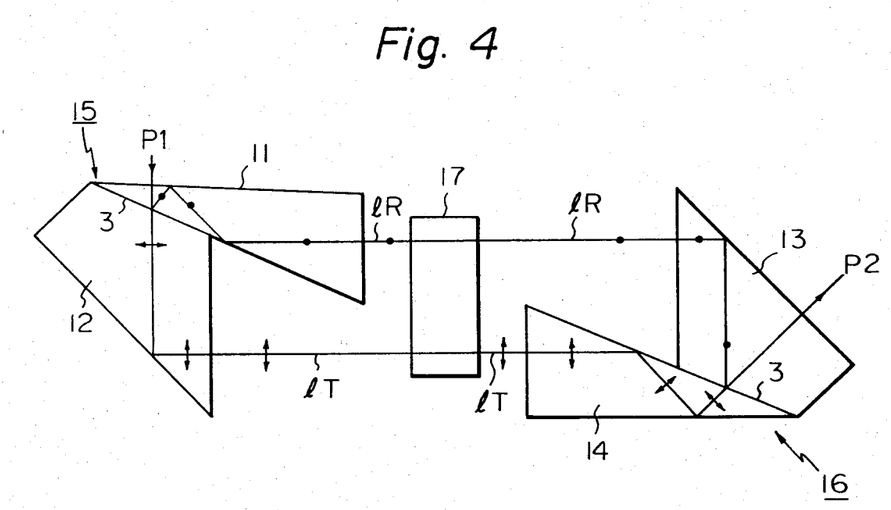
FIGS. 4 through 7 show different operations of an optical circulator using a prism polarizer according to the present invention.

The function of this optical circulator for the beam introduced from the first port $P_1$ is shown in FIG. 4. A natural optical beam from the first port $P_1$ is completely separated into an ordinary beam $l_T$ and an extraordinary beam $l_R$ in a manner described before, at the facing plane of the prisms 11 and 12 of the first polarizer 15. The rotatory polarization device 17 is arranged so that the polarization planes of these beams from the left side in the drawing are not rotated as mentioned before. Therefore, the ordinary beam $l_T$ and the extraordinary beam $l_R$ are unchanged by the rotatory polarization devcie 17 and introduced into the second polarizer 16 as the ordinary beam and the extraordinary beam, respectively. At the facing plane 3 of the prisms 13, 14 of the second polarizer 16, the extraordinary beam $l_R$ is totally reflected, while the ordinary beam $l_T$ is transmitted through this plane 3. Therefore, the two beams $l_T$ and $l_R$ are combined within the prism 13 and transmitted out of the prism 13 through the second port $P_2$.

Figure 5:
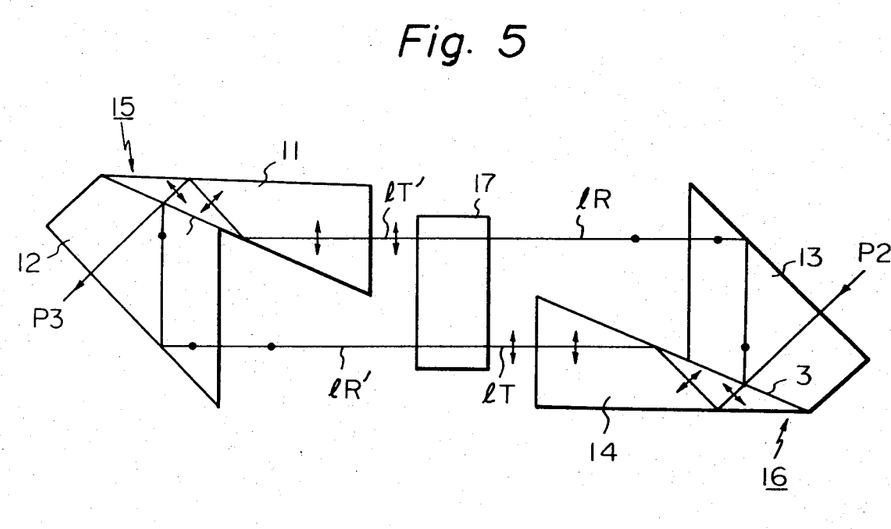

The path of a natural beam from the second port $P_2$ is illustrated in FIG. 5. The beam is separated into an ordinary beam $l_T$ and an extraordinary beam $l_R$ and pass through the rotatory polarization device 17. As mentioned before, the polarization plane of the beam entering the rotatory polarization device from the right side in the drawing is rotated by 90° by the rotatory polarization device 17. Therefore, the ordinary beam $l_T$ is changed to an extraordinary beam $l_R$, while the extraordinary beam $l_R$ is changed to an ordinary beam $l_T$. Each of the beams $l_{R'}$ and $l_{T'}$ is introduced into the first polarizer 15. At the facing plane 3 of the prisms 11, 12 of this first polarizer 15, the extraordinary beam $l_{R'}$ is totally reflected, while the ordinary beam $l_{T'}$ is transmitted through this plane 3. Therefore, the two beams $l_{R'}$ and $l_{T'}$ are combined together within the prism 12 and transmitted out of the prism 12 through the third port $P_3$.

Figure 6:
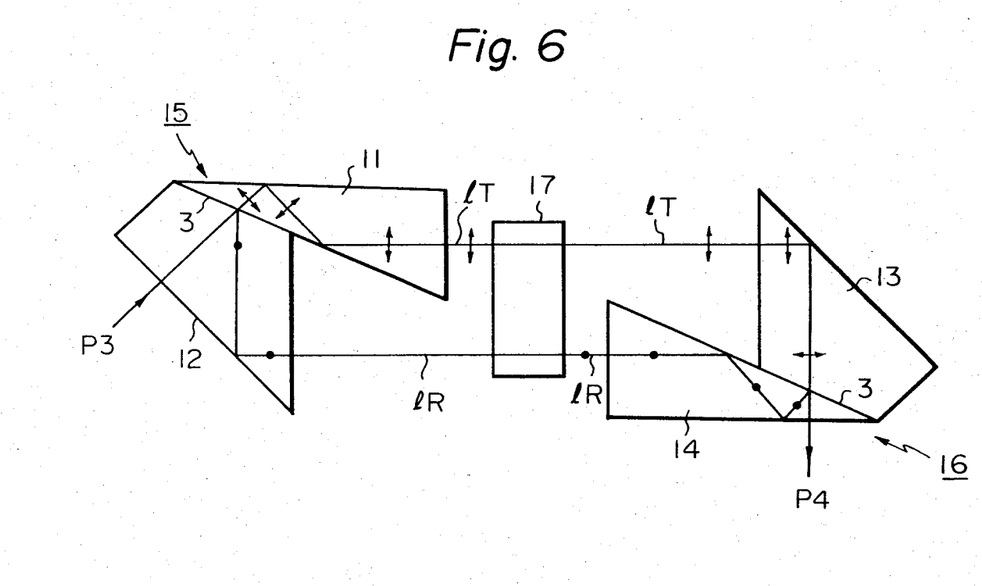

The path of a natural beam from the third port $P_3$ is illustrated in FIG. 6. The beam from the third port $P_3$ is transmitted to the fourth port $P_4$ in a manner similar to the manner of transmitting a beam from the first port $P_1$.

Figure 7:
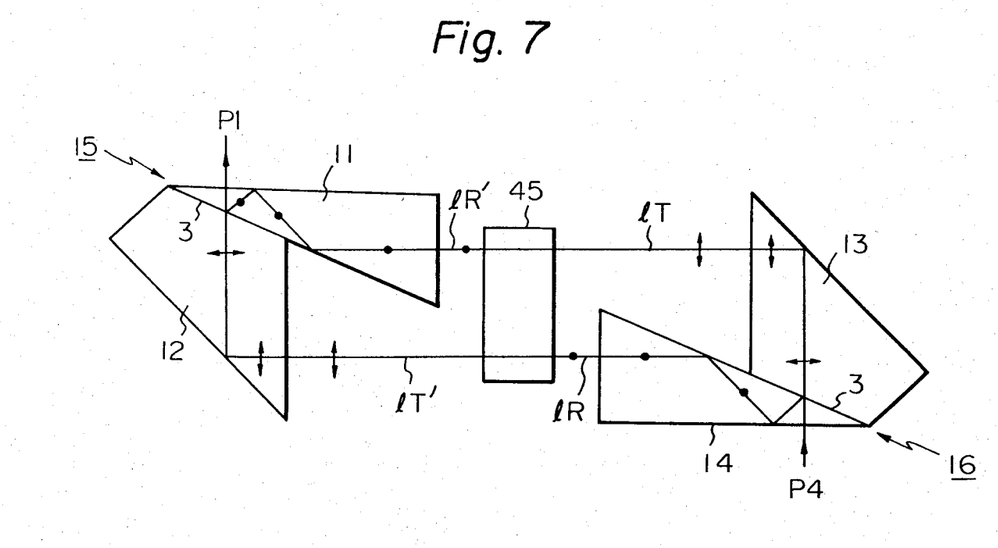

The path of a natural beam from the fourth port $P_4$ is illustrated in FIG. 7. The beam from the fourth port $P_4$ is transmitted to the first port $P_1$ in a manner similar to the manner of transmitting a beam from the second port $P_2$.

In the above mentioned optical circulator, the incident beam upon the facing plane of the pair of prisms of the polarizer is completely separated into an ordinary beam and an extraordinary beam due to the optical characteristic of this polarizer. Also, the separated two beams are completely combined together in the other polarization due to the optical characteristic of this polarizer. Therefore, transmission loss and crosstalk are minimized.

The separated ordinary beam $l_T$ and the extraordinary beam $l_R$ are parallel and close to each other. Therefore, one common rotatory polarization device 17 can be used for the two beams instead of providing one device for each beam.

If the two beams are not parallel to each other, one common rotatory polarization device cannot be used for the reason set forth below. If the two beams are not parallel to each other, the direction of at least one beam does not align with the direction of the magnetic field of the Faraday rotator. In such a condition, a linearly polarized ray (a completely polarized ray) is changed to an elliptically polarized ray (an incompletely polarized ray) instead of being changed to a linearly polarized ray, after the rotation of the polarization plane by the rotatory polarization device. Therefore, the homogeneity of each of the separated beams is degraded by passing through the rotatory polarization device. Accordingly, it is necessary to use one rotatory polarization device for each beam, if the separated beams are not parallel.

Also, in the optical circulator illustrated in FIGS. 4 through 7, another prism, a mirror or other optical devices for paralleling the separated beams are not necessary since the separated ordinary beam and the extraordinary beam are parallel to each other. The transmission loss within the above mentioned prism, mirror or other optical devices is avoided. Therefore, the optical loss is decreased and the manufacturing cost can be lowered since the number of parts is decreased and the optical path length is shortened.

The shape of the prism of the polarizer according to the present invention is not limited to the shape illustrated in FIG. 1, but can be modified into various shapes. Modified examples are illustrated in FIGS. 9 through 12. One of a pair of prisms of the polarizer is illustrated in each drawing. Reference numeral 3 designates the facing plane of the pair of prisms of the polarizer. Any two of the prisms illustrated in FIGS. 9 through 12, i.e. either two different prisms or the same two prisms out of the four prisms, can be combined to make a pair of prisms of the polarizer.

Figure 9:
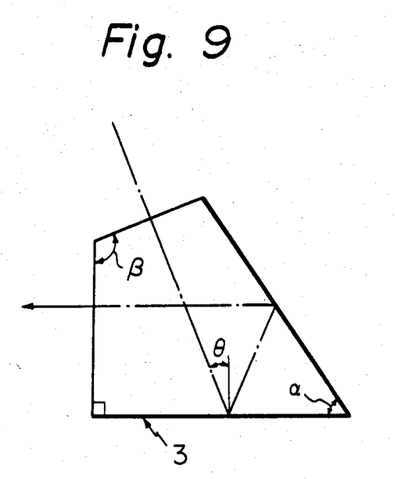
FIGS. 9 through 12 shows different embodiments of the present invention.
Figure 10:
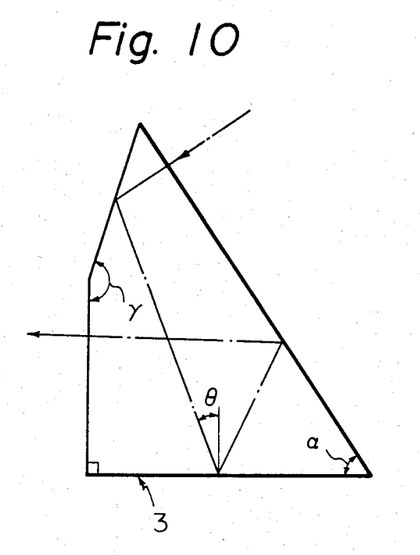
Figure 11:
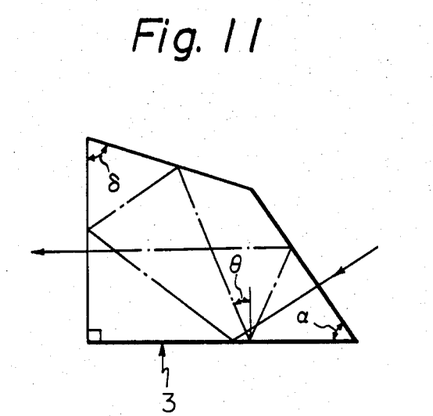
Figure 12:
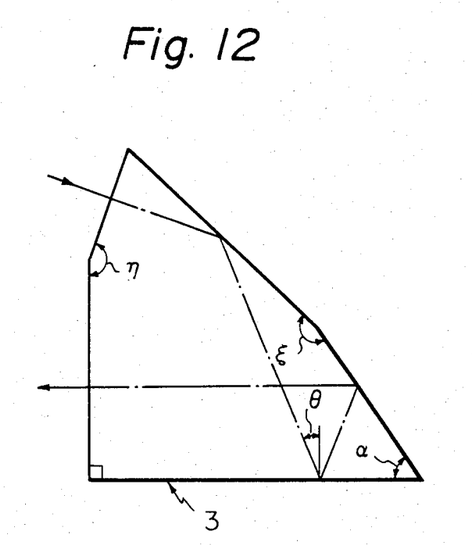
Figure 13:
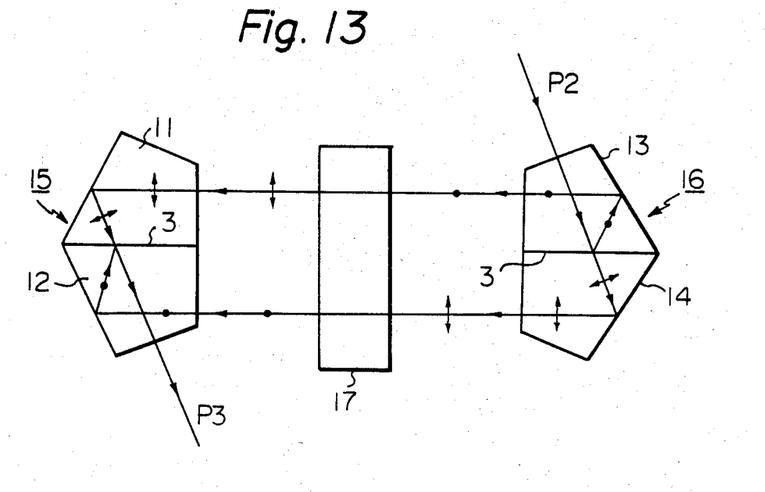
FIG. 13 is a view of an optical circulator using the prism polarizer of FIG. 9.

An optical circulator comprising prisms of FIG. 9 is illustrated in FIG. 13. In FIG. 13, an optical beam is transmitted from the second port $P_2$ to the third port $P_3$. Such a condition corresponds to the condition of FIG. 5. A combination of prisms of different shapes is possible instead of the combination of the prisms of same shape as illustrated in FIG. 13.

Actual value of each vertical angle of each prism is as follows. The value is determined to meet the condition that the outlet beam is parallel with the facing plane 3.

$$\alpha = 45° + \theta/2 = 56.05°$$

$$\beta = 90° + \theta = 112.1°$$

$$\gamma = 157.5° + \theta/4 = 163.025°$$

$$\delta = 67.5° + \theta/4 = 73.025°$$

$$\eta = 540° - 2\theta - 2\xi = 495.8° - 2\xi$$

for example, $\eta = 161,56°$, $\xi = 167.12°$ in which, $\theta$ is the Brewster angle.

If the refractive index changes in accordance with the wavelength of the beam, the shape of the prisms should be changed corresponding to the change of the refractive index.

A common feature of these prisms is that the outlet beam from each prism can be paralleled to the facing plane 3.

Figure 14:
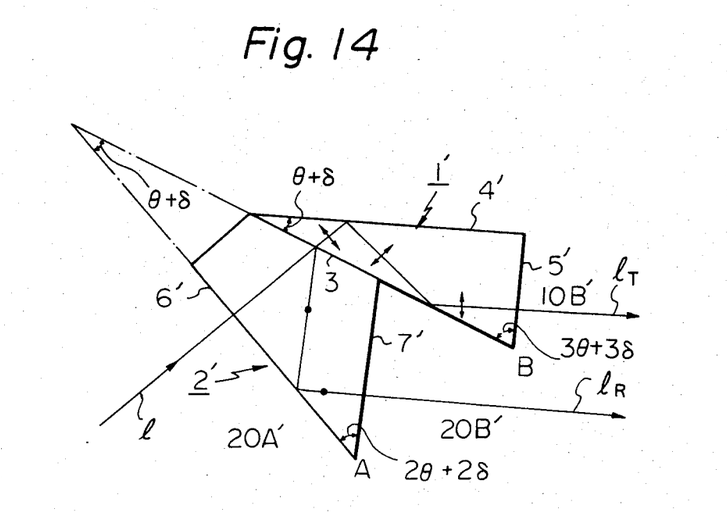
FIG. 14 is a view of another embodiment of the present invention.

Another embodiment of the prism polarizer according to the present invention is illustrated in FIG. 14. In this embodiment, an inlet end surface and an outlet end surface of each prism are slightly inclined with respect to the planes perpendicular to the inlet beam and the outlet beam, respectively. Therefore, the reflected light at the inlet or outlet end surface does not go back in the same path. The inclined angle is within the range of $+1° \sim +6°$ or $-1° \sim -6°$ so that the aforementioned function of the prism can be maintained.

As illustrated in FIG. 14, the surface 4' of the prism 1' is inclined by an angle of $\theta + \delta$ with respect to the facing plane 3. Also, the surface 6' of the prism 2' is inclined by the angle of $\theta + \delta$ with respect to the facing plane 3. $\theta$ is the Brewster angle and $\delta$ is a small inclination angle. The surface 5' of the prism 1' is inclined by the angle of $3\theta + 3\delta$. The surface 7' of the prism 2' is inclined by the angle of $2\theta + 2\delta$ with respect to the surface 6'. The angle of incidence of the inlet beam 1 upon the facing plane 3 is maintained to be the Brewster angle $\theta$ for ordinary rays. The inlet beam 1 is not perpendicular to the surface 6' of the prism 2'. The separated ordinary beam $1_T$ and extraordinary beam $1_R$ are not perpendicular to the surface 5' of the prism 1' and the surface 7' of the prism 2', respectively.

The reflected light at the inlet end surface 6' or the outlet end surface 5' or 7' does not go back in the same path since the path is not perpendicular to each end surface. Consequently, adverse effect upon a laser source can be avoided. The absolute value of the small inclination angle $\delta$ is below 2° so that the difference of refraction angle of the ordinary beam and the extraordinary beam at each end surface can be maintained small for ensuring a reliable communication between the beam and an optical fiber at each port.

I claim:

1. A prism polarizer for separating an incident light beam having P-polarization and S-polarization light rays, comprising:

a pair of anisotropic crystal prisms, wherein each prism has a boundary surface, the boundary surface of a first prism of said pair faced to the boundary surface of the second prism, thus defining a facing plane;

wherein each comprises a crystal which has an optical axis and an optical characteristic such that the difference between the square of the refractive index for light rays having a polarization plane parallel to the optical axis, and the square of the refractive index for light rays having a polarization plane perpendicular to the optical axis, is larger than 1;

the angle of incidence of a beam, exiting one of said prisms, upon the boundary surface of said beam-exiting prism being equal to the Brewster angle for the refractive index for the P-polarization rays, so that the P-polarization rays are transmitted through said boundary surface of said beam-exiting prism, while the S-polarization rays are totally reflected at said boundary surface of said beam-exiting prism, thereby said incident beam being separated into two polarized beams, and wherein each prism is formed so that each of said two separated polarized beams is totally reflected within each respective prism and the separated polarized beams exit said respective prisms parallel with each other.

2. A prism polarizer according to claim 1, wherein each prism has an inlet end surface inclined with respect to the plane perpendicular to an inlet beam and each prism has an outlet end surface inclined with respect to the plane perpendicular to an outlet beam.

3. A prism polarizer according to claim 1, wherein each prism is made of titanium dioxide.

4. A prism polarizer according to claim 1, wherein a layer of air is formed between said boundary surfaces defining said facing plane of said pair of prisms.

5. A prism polarizer according to claim 1, wherein the S-polarized beam reflected at said boundary surface is again totally reflected within the prism so that this S-polarized beam leaves the prism parallel with said facing plane.

6. A prism polarizer according to claim 5, wherein at least one prism of said pair of prisms is of quadrilateral sectional shape, and formed so that an inlet beam entering said at least one prism is directly transmitted to said boundary surface and is incident on said boundary surface at the Brewster angle, without being reflected within the prism.

7. A prism polarizer according to claim 5, wherein at least one prism of said pair of prisms is of quadrilateral sectional shape, and formed so that an inlet beam entering said at least one prism is totally reflected once within the prism before said inlet beam is incident upon said boundary surface at the Brewster angle.

8. A prism polarizer according to claim 5, wherein at least one prism of said pair of prisms is of quadrilateral sectional shape, and formed so that an inlet beam entering said at least one prism is totally reflected two or more times within the prism before said inlet beam is incident upon said boundary surface at the Brewster angle.

9. An optical circulator comprising:
two prism polarizers for separating incident light beams having P-polarization and S-polarization light rays, each prism polarizer including
a pair of anisotropic crystal prisms, wherein each prism has a boundary surface, the boundary surface of a first prism of said pair faced to the boundary surface of the second prism, thus defining a facing plane;
wherein each prism comprises a crystal which has an optical axis such that the difference between the square of the refractive index for light rays having a polarization plane parallel to the optical axis, and the square of the refractive index for light rays having a polarization plane perpendicular to the optical axis, is larger than 1;
the angle of incidence of a beam, exiting one of said prisms, upon the boundary surface of said beam-exiting prism being equal to the Brewster angle for the refractive index for the P-polarization rays,
so that the P-polarization rays are transmitted through said boundary surface of said beam-exiting prism, while the S-polarization rays are totally reflected at said boundary surface of said beam-exiting prism, thereby said incident beam being separated into two polarized beams, and
wherein each prism of said pair of prisms has an inlet end surface and an outlet end surface, and each of said two separated polarized beams is totally reflected within each respective prism and the separated polarized beams exit said respective prisms parallel with each other;
the outlet end surfaces of said two polarizers are faced to each other;
a rotatory polarization device disposed between the two polarizers and arranged so that said device rotates the polarization plane of a polarized beam from one direction by 90°, while said device does not rotate the polarization plane of a polarized beam from the reverse direction; and wherein said inlet end surfaces of said prisms are used as an inlet and an outlet of said optical circulator.

10. An optical circulator according to claim 9, wherein each prism has an inlet end surface inclined with respect to the plane perpendicular to an inlet beam entering said at least one prism and each prism has an outlet end surface inclined with respect to the plane perpendicular to an outlet beam entering said at least one prism.

11. An optical circulator according to claim 9, wherein each prism of said pair of prisms is made of titanium dioxide.

12. An optical circulator according to claim 9, wherein a layer of air is formed between said boundary surfaces defining said facing plane of said pair of prisms.

13. An optical circulator according to claim 9, wherein the S-polarized beam reflected at said boundary surface is again totally reflected within the prism so that this S-polarized beam leaves the prism parallel with said facing plane.

14. An optical circulator according to claim 13, wherein at least one prism of said pair of prisms is of quadrilateral sectional shape, and formed so that an inlet beam entering said at least one prism is directly transmitted to said boundary surface and is incident on said boundary surface at the Brewster angle, without being reflected within the prism.

15. An optical circulator according to claim 13, wherein at least one prism of said pair of prisms is of quadrilateral sectional shape, and formed so that an inlet beam entering said at least one prism is totally reflected once within the prism before said inlet beam is incident upon said boundary surface at the Brewster angle.

16. An optical circulator according to claim 13, wherein at least one prism of said pair of prisms is of quadrilateral sectional shape, and formed so that an inlet beam entering said at least one prism is totally reflected two or more times within the prism before said inlet beam is incident upon said boundary surface at the Brewster angle.

* * * * *

UNITED STATES PATENT AND TRADEMARK OFFICE
CERTIFICATE OF CORRECTION

PATENT NO. : 4,392,722  
DATED : JULY 12, 1983  
INVENTOR(S) : MASATAKA SHIRASAKI

Page 1 of 4

It is certified that error appears in the above-identified patent and that said Letters Patent is hereby corrected as shown below:

Col. 3, line 12, "of" (second occurrence) should be --to--;
- line 32, "l" should be --$\ell$--;
- line 36, "l" (both occurrences) should be --$\ell$--;
- line 43, "l" should be --$\ell$--;
- line 45, "l" should be --$\ell$--;
- line 47, "l" should be --$\ell$--;
- line 50, "l" should be --$\ell$--;
- line 54, "l" should be --$\ell$--;
- line 55, "$l_T$" should be --$\ell_T$--;
- line 56, "$l_R$" should be --$\ell_R$--.

Col. 4, line 8, "$n_e 2^2$" should be --$n_e^2$--;
- line 10, "$\bar{n}_{o2}$" should be --$n_o^2$--;
- line 12, "$n_e$-" should be --$n_e^2$--;
- line 29, "l" should be --$\ell$--;
- line 30, "$l_T$" should be --$\ell_T$--;
- line 31, "$l_R$" should be --$\ell_R$--;
- line 32, "$l_T$" should be --$\ell_T$--;
- line 35, "l" should be --$\ell$--; and "$l_T$" should be --$\ell_T$--;

UNITED STATES PATENT AND TRADEMARK OFFICE
CERTIFICATE OF CORRECTION

PATENT NO. : 4,392,722

DATED : JULY 12, 1983

INVENTOR(S) : MASATAKA SHIRASAKI

Page 2 of 4

It is certified that error appears in the above-identified patent and that said Letters Patent is hereby corrected as shown below:

line 36, "$1_T$" should be --$\ell_T$--;
line 39, "$1_T$" should be --$\ell_T$--;
line 43, "$1_T$" should be --$\ell_T$--;
line 44, "1" should be --$\ell$--;
line 45, "1" should be --$\ell$--; and
"$1_T$" should be --$\ell_T$--;
line 52, "$1_T$" should be --$\ell_T$--;
line 53, "$1_R$" should be --$\ell_R$--;
line 54, "$1_T$" should be --$\ell_T$--; and
"$1_R$" should be --$\ell_R$--;
line 56, "$1_T$" should be --$\ell_T$--;
line 57, "$1_R$" should be --$\ell_R$--;
line 59, "$1_R$" should be --$\ell_R$--;
line 61, "$1_T$" should be --$\ell_T$--; and
"$1_R$" should be --$\ell_R$--;
line 65, "$1_T$" should be --$\ell_T$--; and
"$1_R$" should be --$\ell_R$--;
line 67, "$1_T$" should be --$\ell_T$--; and
"$1_R$" should be --$\ell_R$--.

Col. 5, line 1, "$1_T$" should be --$\ell_T$--; and
"$1_R$" should be --$\ell_R$--.

UNITED STATES PATENT AND TRADEMARK OFFICE
CERTIFICATE OF CORRECTION

PATENT NO. : 4,392,722
DATED : JULY 12, 1983
INVENTOR(S) : MASATAKA SHIRASAKI

It is certified that error appears in the above-identified patent and that said Letters Patent is hereby corrected as shown below:

Col. 6, line 14, "$1_T$" should be --$\ell_T$--;
line 15, "$1_R^T$" should be --$\ell_R^T$--;
line 20, "$1_T$" should be --$\ell_T$--;
line 21, "$1_R$" should be --$\ell_R$--;
line 22, "devcie" should be --device--;
line 25, "$1_R$" should be --$\ell_R$--;
line 26, "$1_T$" should be --$\ell_T$--;
line 27, "$1_T$" should be --$\ell_T$--;
line 28, "$1_R$" should be --$\ell_R$--;
line 32, "$1_T$" should be --$\ell_T$--; and
"$1_R$" should be --$\ell_R$--;
line 37, "$1_T$" should be --$\ell_T$--;
line 38, "$1_R$" should be --$\ell_R$--;
line 39, "$1_R$" should be --$\ell_R$--; and
"$1_T$" should be --$\ell_T$--;
line 40, "$1_R$" should be --$\ell_R'$--; and
"$1_T$" should be --$\ell_T'$--;
line 42, "$1_R'$" should be --$\ell_R'$--;
line 43, "$1_T'$" should be --$\ell_T'$--;
line 44, "$1_R'$" should be --$\ell_R'$--;
line 45, "$1_T'$" should be --$\ell_{T'}$--;
line 65, "$1_T$ and" should be --$\ell_T$ and--;
line 66, "$1_R$" should be --$\ell_R$--.

UNITED STATES PATENT AND TRADEMARK OFFICE
CERTIFICATE OF CORRECTION

PATENT NO. : 4,392,722

DATED : JULY 12, 1983

INVENTOR(S) : MASATAKA SHIRASAKI

It is certified that error appears in the above-identified patent and that said Letters Patent is hereby corrected as shown below:

Col. 8, line 9, "1" should be --$1°$--;
line 19, "1" should be --$\ell$--;
line 21, "1" should be --$\ell$--;
line 22, "$1_T$" should be --$\ell_T$--;
line 23, "$1_R$" should be --$\ell_R$--;
line 34, after "small" insert --enough--;
line 46, after "each" insert --prism--.

Signed and Sealed this

Fifteenth Day of November 1983

[SEAL]

Attest:

GERALD J. MOSSINGHOFF

Attesting Officer  Commissioner of Patents and Trademarks